United States Patent
Dodrill et al.

(10) Patent No.: US 6,490,564 B1
(45) Date of Patent: Dec. 3, 2002

(54) ARRANGEMENT FOR DEFINING AND PROCESSING VOICE ENABLED WEB APPLICATIONS USING EXTENSIBLE MARKUP LANGUAGE DOCUMENTS

(75) Inventors: Lewis Dean Dodrill, Richmond, VA (US); Geetha Ravishankar, Glen Allen, VA (US); Satish Joshi, Glen Allen, VA (US); Keith M. Basil, Norfolk, VA (US); Ryan Alan Danner, Glen Allen, VA (US); Steven J. Martin, Richmond, VA (US); Swaminathan Ravishankar, Glen Allen, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/501,516

(22) Filed: Feb. 9, 2000

Related U.S. Application Data

(60) Provisional application No. 60/152,316, filed on Sep. 3, 1999.

(51) Int. Cl.[7] .............................. G10L 21/06; G06F 9/30; G06F 9/44
(52) U.S. Cl. ..................... 704/275; 704/270.1; 717/114; 709/310
(58) Field of Search ................................. 704/275, 270, 704/260, 243; 455/414; 705/52; 345/24; 717/107

(56) References Cited

U.S. PATENT DOCUMENTS

| | | | |
|---|---|---|---|
| 4,837,798 A | | 6/1989 | Cohen et al. |
| 6,055,424 A | * | 4/2000 | Tornqvist et al. ............ 455/414 |
| 6,057,835 A | * | 5/2000 | Sato et al. ..................... 345/24 |
| 6,141,724 A | * | 10/2000 | Butler et al. ................. 717/107 |
| 6,253,193 B1 | * | 6/2001 | Ginter et al. .................. 705/52 |
| 6,385,583 B1 | * | 5/2002 | Ladd et al. .................. 704/275 |

OTHER PUBLICATIONS

Hartman et al ("VoiceXML Builder: A Workbench for Investigating Voiced–Based Applications", 31st Annual Frontiers in Education Conference, Oct. 2001).*

Danielsen ("The Promise of a Voice–Enabled Web", article in Computer magazine, pp. 104–106, Aug. 2000).*

BOS, "XML in 10 Points", W3.org (Aug. 26, 1999).

* cited by examiner

*Primary Examiner*—Richemond Dorvil
*Assistant Examiner*—Daniel Nolan
(74) *Attorney, Agent, or Firm*—Leon R. Turkevich

(57) ABSTRACT

A unified web-based voice messaging system provides voice application control between a web browser and an application server via an hypertext transport protocol (HTTP) connection on an Internet Protocol (IP) network. The application server executes the voice-enabled web application by runtime execution of extensible markup language (XML) documents that define the voice-enabled web application to be executed. Each voice application operation can be defined as any one of a user interface operation, a logic operation, or a function operation. Each XML document includes XML tags that specify the user interface operation, the logic operation and/or the function operation to be performed within a corresponding voice application operation, the XML tags being based on prescribed rule sets that specify the executable functions to be performed by the application runtime environment.

48 Claims, 14 Drawing Sheets

```
<xml       version = "1.0" >
                                          ← 104
<state     sesid = "12345" >

106 → <item    name: "IMAP_Uid"         value = "user1" />

108 → <item    name: "IMAP_PW"          value = "abxy" />

110 → <item    name: "XML_Menu_State"   value = "main.xml" />

< / state >
```
102

FIG. 5

```
<HTML>
<HEAD>
<TITLE> Hello </TITLE>
<BODY>
    208──►  <FORM>
                (Form contents)
            <FORM>
   ┌──►<EMBED file="http://server/wavdirectory/wavfile.wav" autostart=true>
   200     <XML>
               ┌─<PROMPTLIST>
           204'      <PROMPT type = "wav" name = "wavurl1" />
                     <PROMPT type = "wav" name = "wavurl2" />
       202──►   <PROMPTLIST>
               ┌─<RECORD upload = "upload URL"
           206'         filename = "local filename to use"
                        maxlength = "maximum record length"
            />
        </XML>
    </HTML>

</body>
    </html>
```

```xml
< ?xml version="1.0" ?>
< ! DOCTPE DOCUMENT [
    < ! ELEMENT DOCUMENT (MenuVariables, Options) >

< ! ELEMENT MenuVariables (#PCDATA) = >
    < ! ATTLIST MenuVariables name CDATA #REQUIRED
                              value CDATA #REQUIRED>
    < ! ELEMENT Options       (#PCDATA) =>
    < ! ATTLIST Options name  CDATA #REQUIRED
                       value  CDATA #REQUIRED
                       text   CDATA #IMPLIED>
] >

<DOCUMENT>                                                                    130
    <MenuVariables name="MenuName"       value="Login Menu = Enter PIN"/>
    <MenuVariables name="DefaultPrompt"  value="LOG_GET_PASSWD_PROMPT.wav"/>
    <MenuVariables name="Components"     value=""/>                126
    <MenuVariables name="Conditions"     value=""/>
    <MenuVariables name="Fallback"       value="PASSTHRU_LOG_INC_LOCK.xml"/>
    <MenuVariables name="Type"           value="ACTIVITY"/>  ← 113
    <MenuVariables name="InputMask"      value="StandardPIN"/>
    <MenuVariables name="Images"         value="tiny_web_um.jpg,php3_logel.gif"/>
    <MenuVariables name="Text"           value=" Please enter your PIN followed by
the pound key. If you make a mistake, press star 3 and start again.           "/>
    <Options name="Action"    value="session_validate"  ←—— 122
            text=""/>
    <Options name="Input"     value="PASSTHRU_LOG_RESET_LOCK.xml"  ← 124
            text=""/>
    <Options name="#"         value="SOUND:LOG_GET_PASSWD_HELP,wav,AUD_
                                    COMMON_HELP_PROMPT_2.wav"
            text="please enter your pin. "/>
    <Options name="*0"        value="SOUND:LOG_GET_PASSWD_HELP. wav, AUD_
                                    COMMON_HELP_PROMPT_2.wav"
            text=""/>
    <Options name="*1"        value="MENU:LOG_GET_EXTENSION_MENU.xml"   126
            text=""/>
    <Option name="*2"         value="MENU:LOG_GET_EXTENSION_MENU.xml"
            text=""/>
    <Option name="*3"         value="MENU:LOG_GET_PASSWD_MENU.xml"
            text=""/>
    <Option name="*5"         value="DECISION:PASSTHRU_SAYGOODAY. xml"
            text=""/>
    <Option name="*9"         value="DECISION:LOGOUT_GOODBYE.xml"
            text=""/>
</DOCUMENT>
```
120

FIG. 8A

```
<?xml version="1.0" ?>
< ! DOCTYPE DOCUMENT [
   < ! ELEMENT DOCUMENT (MenuVariables, Options) >

< ! ELEMENT MenuVariables (#PCDATA) *>
   < ! ATTLIST   MenuVariables name CDATA #REQUIRED
                               value CDATA #REQUIRED>
   < ! ELEMENT Options       (#PCDATA) *>
   < ! ATTLIST   Options name  CDATA #REQUIRED
                        value  CDATA #REQUIRED
                        text   CDATA #IMPLIED>
]>

<DOCUMENT>
  <MenuVariables name="MenuName"        value="Name"/>
  <MenuVariables name="Fallback"        value="LOGOUT_SYSFAILURE.xml"/>
  <MenuVariables name="Type"            value="DECISION"/>  ◄── 113
  <MenuVariables name="InputMask"       value="StandardMenu"/>
  <MenuVariables name="Text"            value="    ^M
"/>
  <Options name="Action"   value="badlogin_reset"  ◄── 122
        text=""/>
  <Options name="0"        value="DECISION:LOGOUT_SYSFAILURE.xml"
        text=""/>
  <Options name="1"        value="DECISION:DECISION_CHOOSE_USER_LEVEL.xml"
        text=""/>
</DOCUMENT>
```

```xml
<?xml version="1.0" ?>
<!DOCTYPE DOCUMENT [
   <! ELEMENT DOCUMENT (MenuVariables, Options) >

<! ELEMENT MenuVariables (#PCDATA) *>
   <! ATTLIST  MenuVariables name CDATA #REQUIRED
                             value CDATA #REQUIRED>
   <! ELEMENT Options       (#PCDATA) *>
   <! ATTLIST  Options name  CDATA #REQUIRED
                       value CDATA #REQUIRED
                       text  CDATA #IMPLIED>
]>

<DOCUMENT>
 <MenuVariables name="MenuName"          value="Decision Choose User Level"/>
 <MenuVariables name="DefaultPrompt"     value=""/>
 <MenuVariables name="Components"        value=""/>
 <MenuVariables name="Conditions"        value=""/>
 <MenuVariables name="Fallback"          value="DECISION_CHOOSE_USER_
                                                LEVEL.xml"/>
 <MenuVariables name="Type"              value="DECISION"/>  ◄— 113
 <MenuVariables name="InputMask"         value="StandardMenu"/>
 <MenuVariables name="Images"            value=""/>
 <MenuVariables name="Text"              value="          ^M
"/>
 <Options name="Action"    value="session_checkuserlevel"  ◄— 122
          text=""/>
 <Options name="0"         value="MENU:IUE_FORCE_RECORD_PIN.xml"
          text=""/>
 <Options name="1"         value="MENU:IUE_FORCE_RECORD_PIN.xml"
          text=""/>
 <Options name="2"         value="MENU:IUE_FORCE_RECORD_PIN.xml"
          text=""/>
 <Options name="3"         value="MENU:IUE_FORCE_RECORD_SPOKEN_NAME.xml"
          text=""/>
 <Options name="4"         value="MENU:IUE_FORCE_RECORD_SPOKEN_NAME.xml"
          text=""/>
 <Options name="5"         value="MENU:IUE_FORCE_RECORD_ALL_CALLS.xml"
          text=""/>
 <Options name="6"         value="MENU:IUE_FORCE_RECORD_ALL_CALLS.xml"
          text=""/>
 <Options name="7"         value="DECISION:DECISION_INV_NEW.xml"
          text=""/>
</DOCUMENT>
```

```xml
<?xml version="1.0" ?>
<! DOCTYPE DOCUMENT [
   <! ELEMENT DOCUMENT (MenuVariables, Options) >

<! ELEMENT MenuVariables (#PCDATA) *>
   <! ATTLIST   MenuVariables name CDATA #REQUIRED
                              value CDATA #REQUIRED>
   <! ELEMENT Options         (#PCDATA) *>
   <! ATTLIST   Options name   CDATA #REQUIRED
                        value  CDATA #REQUIRED
                        text   CDATA # IMPLIED>
]>

<DOCUMENT>
  <MenuVariables name="MenuName"     value="Do I have new messages?"/>
  <MenuVariables name="Fallback"     value=""/>
  <MenuVariables name="Type"         value="DECISION"/>
  <MenuVariables name="InputMask"    value="StandardMenu"/>
  <MenuVariables name="Text"         value="              "/>
  <Options name="Action"  value="message_fullreadnewinv"   ← 122
          text="general_readinventory"/>
  <Options name="0"       value="DECISION:LOGOUT_SYSFAILURE.xml"
          text="major problem"/>
  <Options name="1"       value="DECISION:DECISION_INV_AUTOPLAY.xml"
          text="voice"/>
  <Options name="2"       value="MENU:AUD_MAIN_MENU.xml"
          text="fax"/>
  <Options name="3"       value="MENU:AUD_MAIN_MENU.xml"
          text="email"/>
  <Options name="4"       value="DECISION:DECISION_INV_AUTOPLAY.xml"
          text="voice, fax"/>
  <Options name="5"       value="MENU:AUD_MAIN_MENU.xml"
          text="fax, email"/>
  <Options name="6"       value="DECISION:DECISION_INV_AUTOPLAY.xml"
          text="voice, email"/>
  <Options name="7"       value="DECISION:DECISION_INV_AUTOPLAY.xml"
          text="voice, fax, email"/>
  <Options name="8"       value="MENU:AUD_MAIN_MENU.xml"
          text="no new messages"/>
</DOCUMENT>
```

```xml
<?xml version="1.0" ?>
<! DOCTYPE DOCUMENT [
    <! ELEMENT DOCUMENT (MenuVariables, Options) >

<! ELEMENT MenuVariables (#PCDATA) *>
    <! ATTLIST  MenuVariables name CDATA #REQUIRED
                              value CDATA #REQUIRED>
    <! ELEMENT Options        (#PCDATA) *>
    <! ATTLIST  Options name   CDATA #REQUIRED
                        value  CDATA #REQUIRED
                        text   CDATA # IMPLIED>
]>

<DOCUMENT>
    <MenuVariables name="MenuName"       value="Main Menu:"/>
    <MenuVariables name="DefaultPrompt"  value="ACT_ACTIONS-PROMPT.wav"/>
    <MenuVariables name="Components"     value=""/>
    <MenuVariables name="Conditions"     value=""/>
    <MenuVariables name="Fallback"       value="AUD_MAIN_MENU.xml"/>
    <MenuVariables name="Type"           value="MENU"/>  ◄——— 113
    <MenuVariables name="InputMask"      value="StandardMenu"/>
    <MenuVariables name="Images"         value=""/>
    <MenuVariables name="Text"           value=""     If you want your messages
now press 1. To send a voice message, press 2, to work with your greetings press 3,
to administer your mailbox press 5, if you need something else press 0.

<Options name="0"      value="SOUND:ACT_ACTIONS_PROMPT_2.wav"      ——116
            text="More Options"/>
    <Options name="1"      value="MENU:ACT_GET_VOICE_FAX_EMAIN_MENU.xml"◄——114
            text="Access your voice, fax and e-mail."/>   ◄——— 118
    <Options name="2"      value="MENU:REC_ASK_ADDRESS_MENU.xml"
            text="Compose and send a new voice message."/>
    <Options name="3"      value="DECISION:DECISION_DETERMINE_ACTIVE_
                                  GREETING.xml"
            text="Work with your greetings"/>
    <Options name="5"      value="MENU:LST_ACTIONS_MENU.xml"
            text=""/>
    <Options name="6"      value="PROC:general_notimp."
            text=""/>
    <Options name="8"      value="SOUND:AUD_WAITING.wav"
            text=""/>
```

| FIG. 8E(1) |
|---|
| FIG. 8E(2) |

FIG. 8E

```
<Options name="*0"     value="SOUND:ACT_ACTIONS_HELP_1_NO_SNR.wav,
ACT_ACTIONS_HELP_2.wav,AUD_COMMON_HELP_1.wav"
          text=""/>
<Options name="*1"     value="PROC:dummy_return1"
          text=""/>
<Options name="*2"     value="PROC:dummy_return1"
          text=""/>
<Options name="*3"     value="SOUND:chris3.wav"
          text=""/>
<Options name="*5"     value="DECISION:PASSTHRU_SAYGOODDAY.xml"
          text=""/>
<Options name="*7"     value="PROC:eegg_catock"
          text=""/>
<Options name="*8"     value="MENU:TRANSFER_MAIN_MENU.xml"
          text=""/>
<Options name="*9"     value="DECISION:LOGOUT_GOODBYE.xml"
          text=""/>
</DOCUMENT>
```

ARRANGEMENT FOR DEFINING AND PROCESSING VOICE ENABLED WEB APPLICATIONS USING EXTENSIBLE MARKUP LANGUAGE DOCUMENTS

CROSS REFERENCE TO RELATED APPLICATIONS

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to generating and executing voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

FIG. 1 is a diagram illustrating the existing public switched telephone network. As shown in FIG. 1, the public switched telephone network 10 includes a wireline subnetwork 12, a wireless subnetwork 14, and a time division multiplexed (TDM) backbone subnetwork 16 configured for transporting voice data and other data between user devices 18 according to the existing public switched telephone network protocols. The subnetwork 16, for example, includes interexchange trunks for transporting voice data between interexchange carriers and/or local exchange carriers.

As shown in FIG. 1, the wireline subnetwork 12 includes telephony application servers 20 configured for providing voice applications 22 such as subscriber profile management, voice mail, call forwarding, etc. for the user devices 18a, 18b, and 18c coupled to the wireline subnetwork 12. As recognized in the art, the telephony application servers 20 include advanced intelligent network (AIN) components such as services control point (SCP) directories and service nodes (SN) configured for controlling the telephony applications 22. The wireline subnetwork 12 also includes telephony access services 24 configured for providing the user devices 18a, 18b, and 18c access to the wireline subnetwork using, for example, analog twisted pair connections or ISDN connections to a central office. The user devices 18a, 18b, and 18c, illustrated as a cordless telephone 18a, a fax machine 18b having a connected telephone, and an analog telephone 18c, are referred to herein as "skinny clients", defined as devices that are able to interface with a user to provide voice and/or data services (e.g., via a modem) but cannot perform any control of the application 22 or the protocol used to interface with the wireline subnetwork 12.

The wireless subnetwork includes wireless application servers 26, and wireless access services 28 for providing wireless voice and data services to the wireless user devices 18d, 18e, and 18f. The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, interact with the wireless application 30 based on respective wireless protocols controlled by the wireless access services 28. The wireless application servers 26 control wireless services such as home location register (HLR) management, and service node (SN) telephony applications. "Tiny clients" are distinguishable from skinny clients in that the tiny clients tend to have even less functionality in providing input and output interaction with a user, and may not be able to send or receive audio signals such as voice signals at all. Examples of tiny clients include wireless user devices 18d, 18e, and 18f, as well as function-specific terminal devices. Note that tiny clients tend to be one-way (receive-only or transmit-only) devices.

In both cases, however, both skinny clients and tiny clients have no control of the respective applications 22 and 30 that are running within the respective networks. Rather, the applications 22 and 30 are executed exclusively by the servers 20 and 26. Moreover, both skinny clients and tiny clients have no control of the access protocol used to access the respective subnetworks 12 and 14; hence, the skinny clients and tiny clients are currently incapable of initiating access to another network using an alternative protocol, for example Internet protocol (IP). Consequently, the skinny clients and tiny clients rely exclusively on the service nodes of the servers 20 and 26 to provide the voice application services programmed in the applications 22 and 30, respectively. Although this exclusive control of the applications 22 and 30 by the servers 20 and 26 is advantageous in maintaining control over quality of service and reliability requirements, the applications 22 and 30 can only be developed and maintained by programmers having sufficient know-how of the public switched telephone network infrastructure. As a result, programmers familiar with open standards such as IP are unable to provide contributions in enhancing the applications 22 and 30 due to the limitations of the public switched telephone network paradigm.

FIG. 2 is a diagram illustrating the web client-server paradigm of an open standards-based IP network 40, such as the World Wide Web, the Internet, or a corporate intranet. The IP network 40 provides client-server type application services for clients 42a and 42b by enabling the clients to request application services from remote servers using standardized protocols, for example hypertext transport protocol (HTTP). The web server application environment 46 includes web server software, such as Apache-based software available from The Apache Software Foundation, implemented on a computer system attached to the IP network 40. Applications 48 are composed of HTML pages, logic, and database functions. In addition, the web server 46 may provide logging and monitoring capabilities.

When the application 48 is written by an application designer, pages are created using an editor. Logic and functions are written in a programming language, such as C, C++, Java, etc. These applications are compiled or interpreted and are invoked through a web server facility such as a Common Gateway Interface (CGI). Hence, pages may be created dynamically by the application 48 as it is executing.

The client 42a, for example, is a stand-alone personal computer or workstation that has its own application 44 for providing its own application services. The client 42a can access the remote web application server 46 that executes the application services 48 via an IP-based packet switched network 50 using either remote access services 52 or local area network access services 54, if available. Similarly, the client 42b having only a browser 56 can also enjoy the services of the applications 44 and 48 by accessing the respective computers 42a and 46.

The clients 42a and 42b, referred to herein as "fat clients" and "thin clients", respectively, have the distinct advantage that they can initiate requests using IP protocol to any connected web server 46 to execute part or most of the applications 48 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

Hence, the web server paradigm enables the clients 42 to access any web server on the IP network 40. Moreover, the use of open protocols such as HTTP and HTML enable any client 42, regardless of its configuration, to access an HTML web page from a server that has no knowledge of the configuration of the requesting client; if the HTML web page received by the client includes information such as a specific HTML tag that is not recognizable by the browser 56, the browser 56 can merely ignore the unrecognized HTML tag.

Efforts have been made to integrate the telephony applications 22 and 30 directly onto the IP network 40 by developing protocol translators that provide a termination between the telephony applications servers 20 and 26 and the web application servers 46. One such proposal is referred to as voice over IP, where telephony data from the telephony applications 22 and 30 are repackaged into IP packets for transmission across the IP network 50. These efforts, however, still require programmers who have substantial know-how of the telephony applications 22 and 30 and the public switched telephone network infrastructure. Moreover, the repackaging of telephony data into IP packets creates substantial problems in transmission of the telephony data, since the transport of IP data packets is not sequential and synchronous, as required for the voice applications.

Another attempt at performing voice applications over an IP network involves rewriting the telephony applications 22 and 30 as scripts in extensible markup language (XML), and sending the XML scripts over the IP network to an interpreter that is coupled to a telephone. The interpreter then plays the received XML scripts for the telephone. However this approach merely transfers some application functionality from the telephony applications 22 and 30 to the interpreter, and still requires telephony application engineers to write XML scripts of the applications 22 and 30. Hence, the IP network is used only for transporting the XML scripts, and does not take advantage of the open standards-based flexibility of the IP network that has provided enormous growth in web infrastructure and Internet commerce.

As described above, the efforts to date at extending the voice applications 22 and 30 from the public switched telephone network to the IP network 40 have had limited success, primarily because the telephone protocols used in development of the applications 22 and 30 do not operate under the same paradigm as the IP network 40. For example, the telephony applications 22 and 30 are state aware, ensuring that prescribed operations between the application servers 20 or 26 and the user devices 18 occur in a prescribed sequence. For example, operations such as call processing operations, voicemail operations, call forwarding, etc., require that specific actions occur in a specific sequence to enable the multiple components of the public switched telephone network to complete the prescribed operations.

The applications 44 and 48 running in the IP network 40, however, are state-less and transient in nature, and do not maintain application state. These applications 44 and 48 are state-less because application state requires an interactive communication between the browser and back-end database servers accessed by the applications 44 and 48. However, an HTTP server provides asynchronous execution of HTML applications: the applications 44 and 48, in response to reception of a specific request in the form of a URL from a client 42, instantiate a program configured for execution of the specific request, send an HTML web page back to the client 42, and terminate the program instance that executed the specific request. Hence, all active information about the HTML page or application processed is cleared, with the exceptions of log data.

Although application state information could be passed between the browser 56 and a web application 48 using a data file referred to as a "cookie", some users prefer not to enable cookies on their browser 56; in addition, the passing of a large amount of state information as would normally be required for voice-type applications between the browser 56 and the web application 48 would substantially reduce the bandwidth available for the client 42, rendering use of the cookie infeasible for voice enabled web applications. Moreover, the use of a cookie is especially infeasible if user specific attributes also needed to be passed between the web application server 46 and the browser Hence, the above-described problems associated with the IP network 40 result in substantial difficulties in attempting to write and manage web voice applications. The nature of voice applications, due to the limitations of input/output capabilities, results in the application 48 needing to do more processing to maintain the user interface as simple as possible. Moreover, the necessity of a standard development environment to write the application in a programming language such as C, C++, PERL, Java, etc., limits the flexibility of the application developer in developing an efficient application suitable for voice applications. Finally, web applications are visual by their nature and lack robust audio content and control, and web servers and their corresponding programming environment do not have a means to simplify the audio content and control.

SUMMARY OF THE INVENTION

There is a need for an arrangement that enables voice applications to be easily defined and processed on an IP packet switched network using the open standards-based flexibility of the IP network.

There is also a need for an arrangement that enables voice applications to be developed by individuals that do not have expertise in the public switched telephone network. For example, there is a need for an arrangement that enables voice applications to be defined and processed by web programmers using open protocol standards.

There is also a need for an arrangement that enables voice applications to be implemented using an IP network, without the necessity of the public switched telephone network.

There is also a need for an arrangement that enables unified voice messaging services to be provided via an IP network to a web browser, where voice enabled web applications can be written and implemented without the necessity of a programming language development environment. In particular, there is a need for an arrangement that enables simplified voice application definition and processing using a document-based application development environment.

There is also a need for an arrangement that enables voice applications to be easily developed and customized by individuals that do not have expertise in programming languages. In particular, there is a need for an arrangement that enables individuals to easily design and customize voice applications without modifying programming code.

These and other needs are attained by the present invention, where a voice-enabled web application is defined using extensible markup language (XML) documents that define the voice application operations to be performed within the voice application. Each voice application operation can be defined as any one of a user interface operation, a logic operation, or a function operation. Each XML document includes XML tags that specify the user interface operation, the logic operation and/or the function operation to be performed within a corresponding voice application operation, the XML tags being based on prescribed rule sets that specify the executable functions to be performed by the application runtime environment. Each XML document may also reference another XML document to be executed based on the relative position of the XML document within the sequence of voice application operations to be performed. The XML documents are stored for execution of the voice application by an application server in an application runtime environment.

Hence, the XML document, which can be written using a conventional editor or word processor, defines the application to be executed by the application server within the runtime environment, enabling voice enabled web applications to be generated and executed without the necessity of programming language environments.

According to one aspect of the present invention, a method is provided in an executable system for defining an executable voice application. The method includes defining a sequence of voice application operations to be performed by the voice application, each voice application operation corresponding to at least one of a user interface operation, a logic operation, and a function operation. The method also includes generating extensible markup language (XML) documents for the voice application operations, respectively, using a prescribed rule set for each of the user interface operation, the logic operation, and the function operation. The rule set specifies executable functions to be performed by an application runtime environment for the corresponding operation. The generating step includes providing at least one XML tag that specifies a corresponding one of the user interface operation, logic operation, and function operation in accordance with the corresponding rule set. The generating step also includes selectively including in each XML document a reference to another one of the XML documents based on the sequence of voice application operations and the corresponding rule set. The XML documents are then stored for execution of the voice application by an application server in the application runtime environment. Hence, web based voice applications can now be developed using open-source XML document development tools such as forms-based document development systems, as opposed to development environments that require compiling applications written in programming languages such as C, C++, PERL, Java, etc. Hence, voice enabled web can now be developed by individuals without the necessity of programming language experience.

Another aspect of the present invention provides a system configured for generating a voice application. The system includes a computer-based system configured for generating extensible markup language (XML) documents for a defined sequence of voice application operations to be performed by the voice application, respectively. Each voice application operation corresponds to at least one of a user interface operation, a logic operation, and a function operation using a corresponding prescribed rule set, the rule set specifying executable functions to be performed by an application runtime environment for the corresponding operation. Each XML document includes at least one XML tag that specifies a corresponding one of the user interface operation, logic operation, and function operation in accordance with the corresponding rule set. Each XML document may also include a reference to another one of the XML documents based on the sequence of voice application operations and the corresponding rule set. The system also includes a storage medium configured for storing the XML documents for execution of the voice application by an application server in the application runtime environment.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 5 is a diagram illustrating a data record generated and stored by the application server of FIG. 4 for preservation of application state and user attributes according to an embodiment of the present invention.

FIG. 6 is a diagram illustrating an HTML page dynamically generated by the application server and having XML voice application control content for a web browser.

FIGS. 8A–8E are diagrams illustrating XML documents, specifying respective voice application operations to be performed by a voice application in a prescribed sequence, according to an embodiment of the present invention.

BEST MODE FOR CARRYING OUT THE INVENTION

The disclosed embodiment is directed to an arrangement for defining an executable voice application using extensible markup language (XML) documents that specify user interface operations, logic operations, and/or function operations. The XML documents are generated using prescribed rule sets that specify executable functions performed by an application runtime environment in an application server. Hence, the application server is able to provide unified voice messaging services and data services via an IP network by executing stored XML documents for voice enabled web applications. In addition to specifying an application operation (e.g., user interface operation, a logical operation, or a procedure call), a stored XML document may also specify an application state for a user session. Hence the application server is able to efficiently execute voice web applications merely by parsing selected XML documents and implementing XML tags that are specified within the selected XML documents.

The ability to provide unified voice messaging services via an IP network enables existing web servers on the World Wide Web or in corporate intranets to support telephone applications on a scalable and economic platform. Moreover, the use of XML documents in defining executable voice applications enables use of open standards that permits web programmers to use forms-based web programming techniques to design and implement voice telephone applications, without the necessity of programming using conventional programming languages. In addition, the use of XML documents in defining executable voice applications provides a structured application tool that enables a user to easily customize a voice application by making relatively minor changes to the XML documents.

A description will first be provided of the unified voice messaging services architecture that uses voice web applications generated using XML documents, followed by a description of the arrangement for defining an executable voice application using XML documents.

Figure 3:
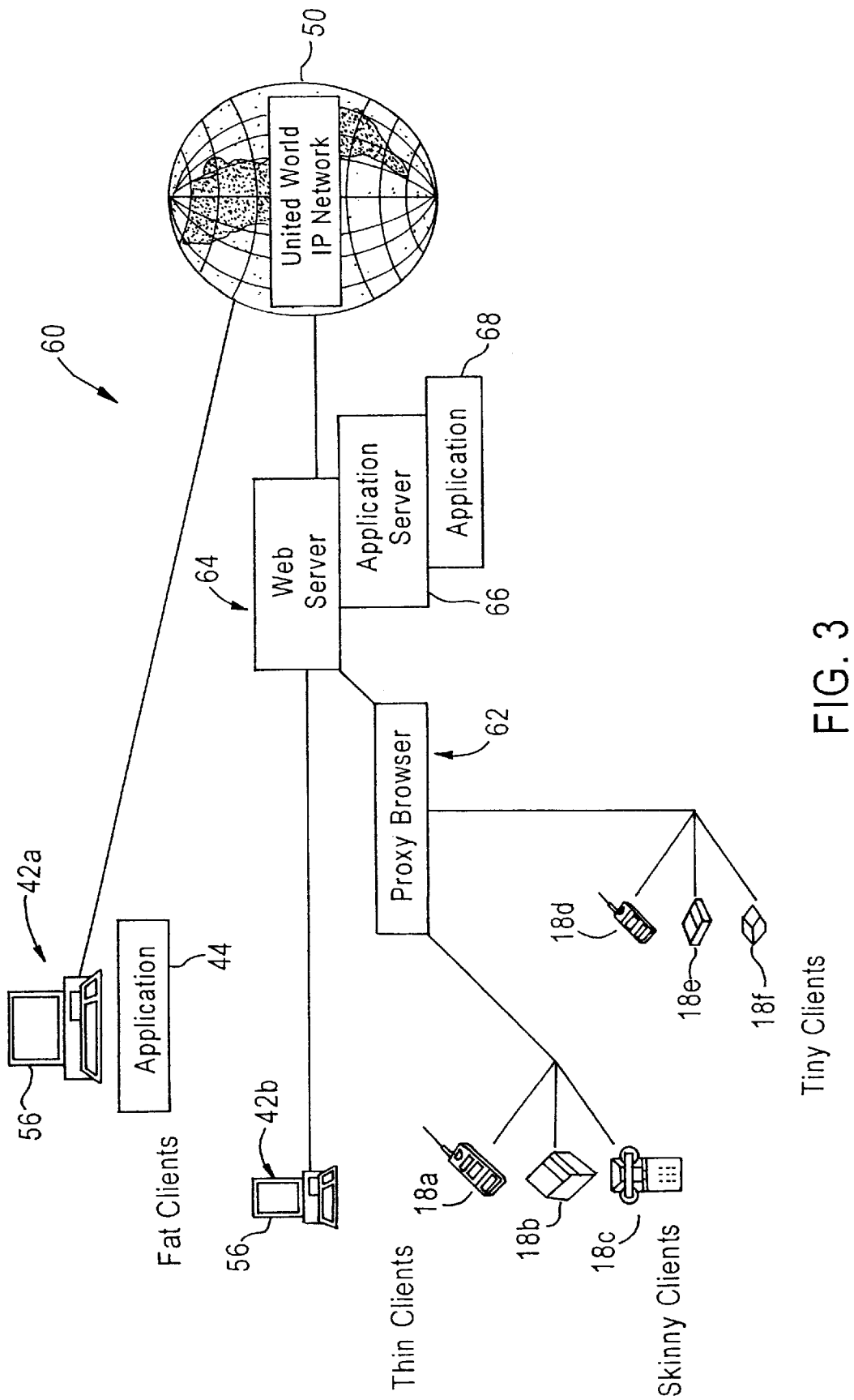
FIG. 3 is a block diagram illustrating a novel paradigm that enables unified voice messaging services and data services to be provided via an IP network using browser audio control according to an embodiment of the present invention.

FIG. 3 is a block diagram illustrating an architecture that provides unified voice messaging services and data services via an IP network using browser audio control according to an embodiment of the present invention. As shown in FIG. 3, each of the clients (tiny clients, skinny clients, thin clients and fat clients) are able to communicate via a single, unified architecture 60 that enables voice communications services between different clients, regardless of whether the client actually has browser capabilities. For example, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The skinny clients 18a, 18b, and 18c and the tiny clients 18d, 18e, and 18f also have access to the unified voice messaging services in the unified network 60 by accessing a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

Figure 1:
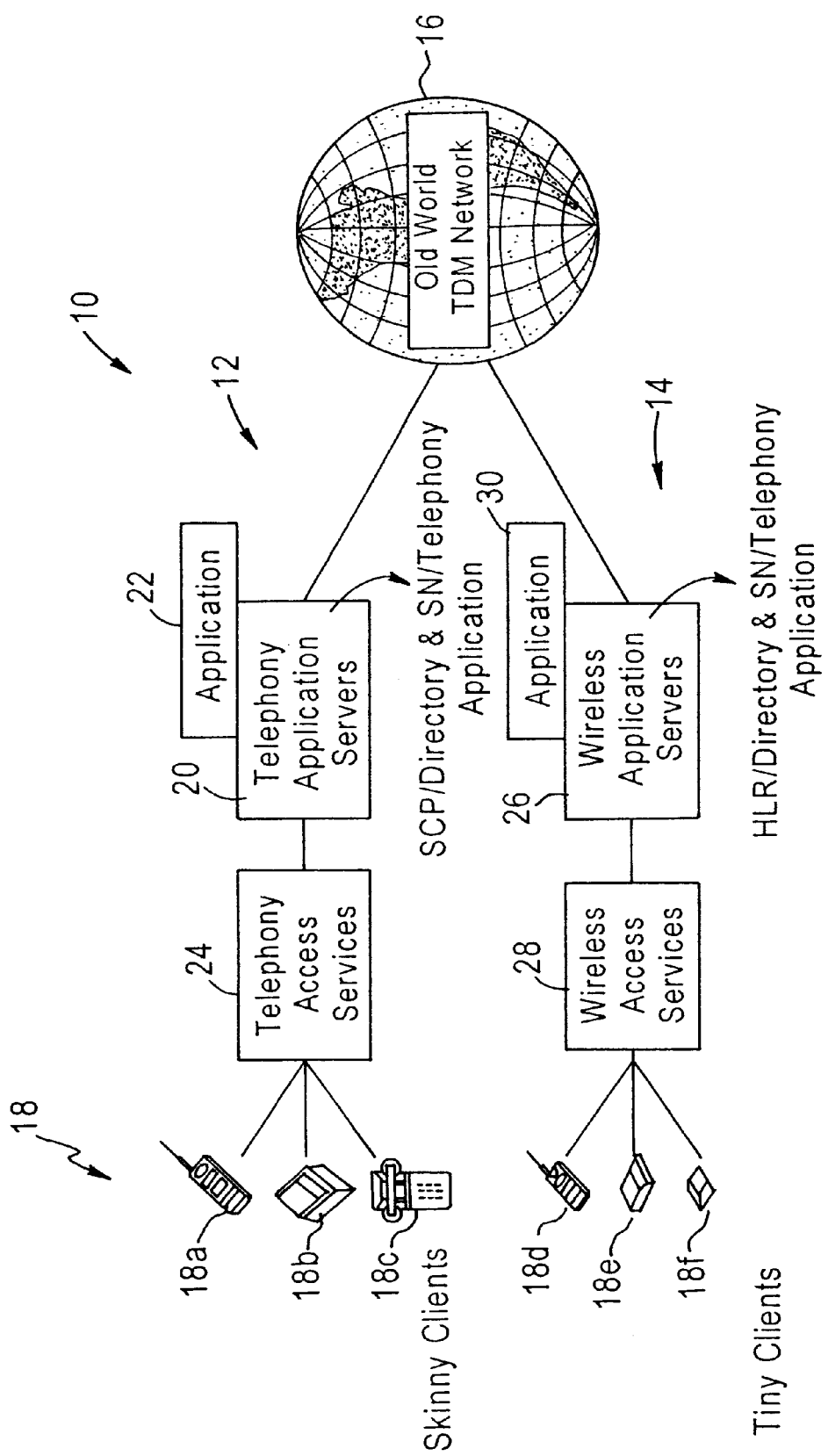
FIG. 1 is a block diagram illustrating an architecture paradigm of the existing public switched telephone network.
Figure 2:
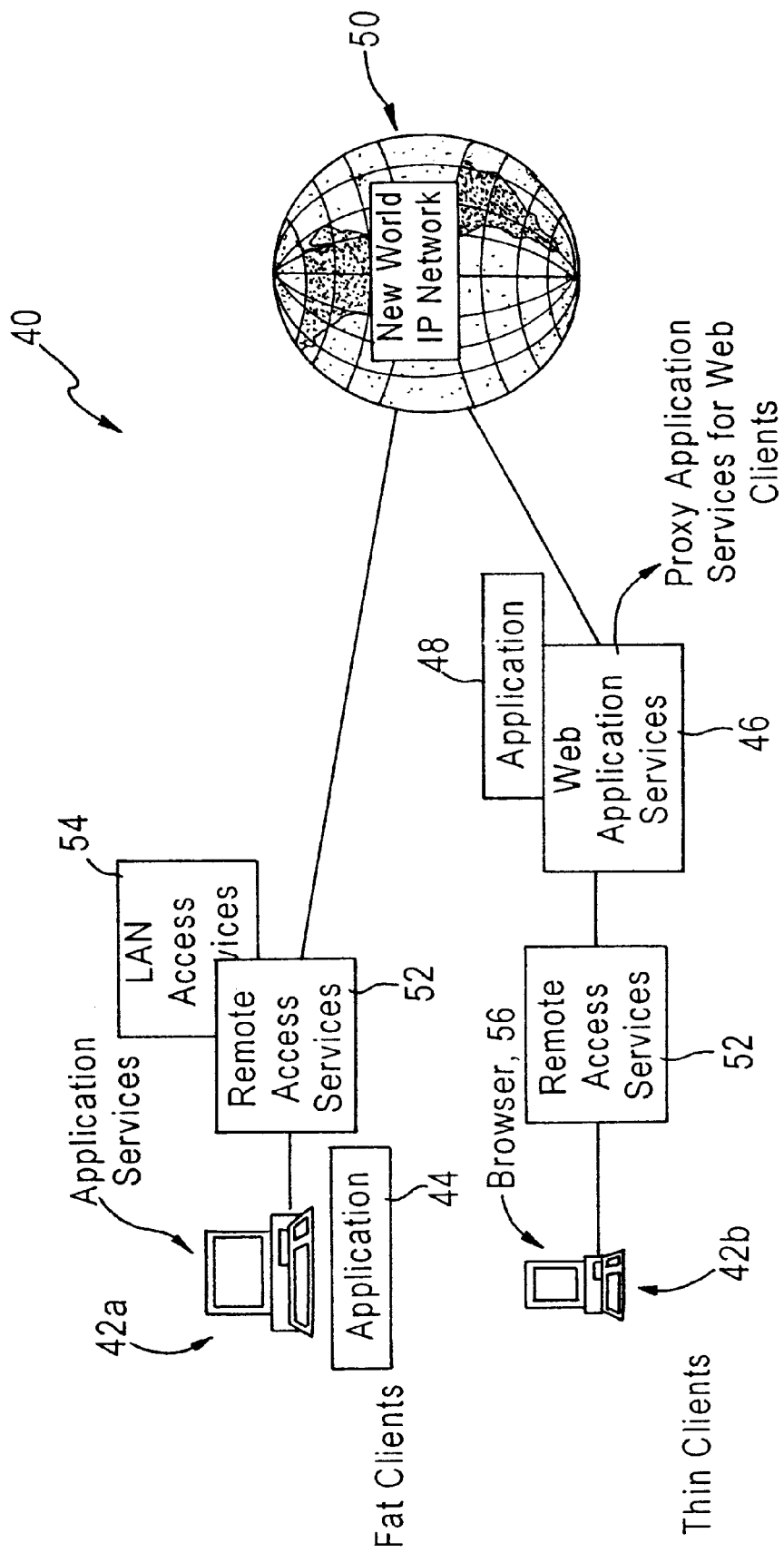
FIG. 2 is a block diagram illustrating an architecture of the existing web client-server paradigm of an Internet protocol (IP) network.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 may be similar to the web application server 46 of FIG. 2 by providing proxy application services for web clients. As described below with respect to FIG. 7, the web server 64 preferably serves as an interface between the browsers and an application server 66 that provides an executable runtime environment 68 for XML voice applications. For example, the web server 64 may access the application server 66 across a common Gateway Interface (CGI), by issuing a function call across an application programming interface (API), or by requesting a published XML document or an audio file requested by one of the browsers 56 or 62; more preferably, the web server 64 would access the application server 66 across a high speed connection, such as an Apache—PHP interface. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 the application server 66 generates new XML documents during runtime and supplies the generated XML documents to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session. Additional details regarding the brownie are described below with reference to FIG. 5.

Figure 4:
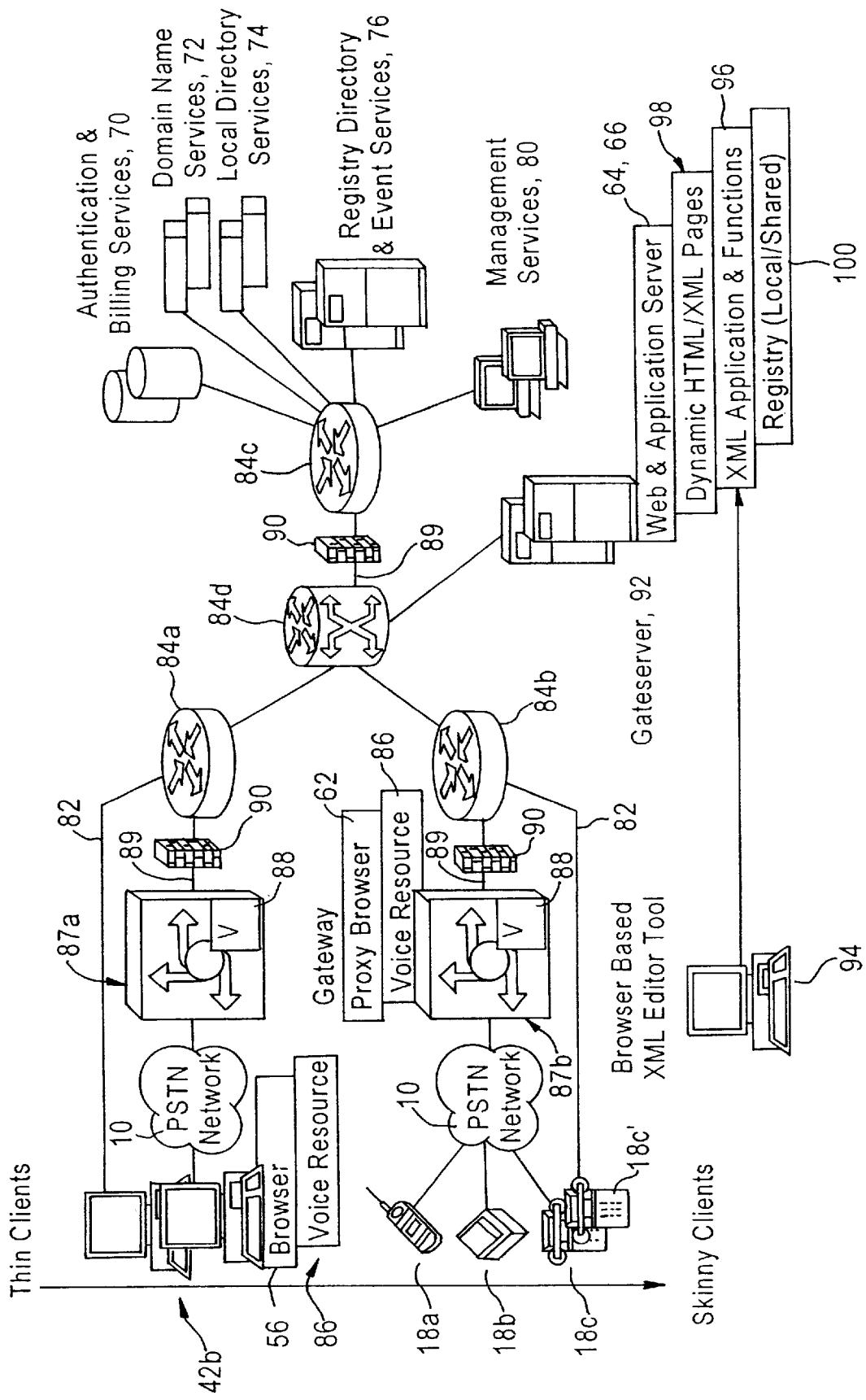
FIG. 4 is a diagram illustrating in further detail implementation of voice applications on the IP network of FIG. 3 including the application server for generating a data record according to an embodiment of the present invention.

FIG. 4 is a diagram that illustrates in further detail the network 60 of FIG. 3. As shown in FIG. 4, the arrangement of providing browser audio control for voice enabled web applications by the web server 64 and the application server 66 enables voice application services to be implemented in a web server paradigm for many different telephony services, including authentication and billing services 70, domain name services 72, local directory services 74, registry directory and event services 76, and management services 80.

FIG. 4 also illustrates in further detail the browser and web application server interaction. In particular, the thin clients 42b (and fat clients 42a) may be configured for accessing the web server 64 via a direct IP connection 82 to a router (e.g., 84a or 84b) in communication with other routers (e.g., 84d and 84c). The thin client 42b can directly access the web server 64 for voice enabled web application services if the thin client 42b has a browser 56 and an executable voice resource 86, for example an executable XML aware plug-in resource, or a Java applet embedded within a received HTML page. Alternatively, the thin client 42b may access the web server 64 via the public switched telephone network 10, where an IP gateway 87a includes a voice over IP interface 88 that sends information to the server 64 using an HTTP connection 89 via a firewall 90.

Since the skinny clients and tiny clients 18 do not have browser resources, the skinny clients and tiny clients 18 access the proxy browser 62 via the PSTN 10 and the IP gateway 87b. The IP gateway 87b includes both a proxy browser 62 and a voice resource 86, enabling the IP gateway 87 to provide all audio control service for the skinny clients and tiny clients 18. Hence, the PSTN 10 is used merely for transfer of analog audio signals, with intelligent application processing being provided by the proxy browser 62. Note that if one of the telephones 18c' is an IP telephone, then it can access the server 64 via an IP connection 82; in this case, the browser internal to the IP telephone 18c' would process only audio functions, and would ignore any tags associated with text or image content.

As shown in FIG. 4, the web server 64, the application server 66, and the voice web applications 68 reside within a gateserver 92. The gateserver 92 includes a browser based XML editor tool 94 that enables a web programmer to design voice applications using XML documents. The browser based XML editor tool 94 may be a form-based editor that enables a user to call up different XML forms for use in designing XML documents for the XML voice application.

As described in detail below with respect to FIGS. 8 and 9, the browser based XML editor tool 94 serves as a computer-based system that generates XML documents for execution of voice application operations such as a user interface operation, a logic operation, and a function operation using a corresponding prescribed rule set. In particular, the rule set is defined as the set of XML based parameters (i.e., XML tags) recognizable by the application server 66 in executing prescribed functions in an application runtime environment; hence, a web programmer can design a voice application by defining the sequence of voice operations to be performed by the voice application, and writing for each voice application operation an XML document having XML tags that specify the appropriate operation to be performed (user interface operation, logic operation, and/or function operation), in accordance with the rule set for the application server 66.

The XML documents are stored as XML applications and functions 96, for example within a document database accessible by the application server 66. Certain XML documents stored within the XML application and functions 96 database may be stored as static pages to be fetched by the web server 64 and supplied to a browser, however other XML documents define the unified voice applications to be executed by the application server 66 in runtime, described below.

The application server 66 executes stored XML applications, also referred to generally as a web applications, in response to HTML requests from the user. In particular, four types of XML documents are used by the application server 66 to execute web applications: menu documents, activity documents, decision documents, and "brownies". The menu documents, activity documents, and decision documents are XML documents that define user interface and boolean-type application logic for a web application, hence are considered "executable" by the application server 66. The brownie document is an XML data record used to specify application state and user attribute information for a given XML application during a user session. During execution of the stored XML applications, the application server 66 stores the "brownie" in a registry 100.

Hence, the XML documents define user interface logistics and tie services and application server events together in a meaningful way, forming a coherent application or sets of applications.

FIG. 5 is a diagram illustrating a brownie 102 that specifies application state and user attribute information according to an embodiment of the present invention. As shown in FIG. 5, the brownie 102, generated and maintained by the application server 66, is implemented as an XML document that includes XML tags that specify the application state and user attribute information. For example, the brownie 102 includes an XML tag 104 that specifies a session identifier ("sesid") for a unique application session. As described below, the application server 66 generates a unique session identifier 104 for each brownie 102, enabling each user to have his or her own unique brownie 102 for a given interactive user session.

The application server 66 also generates XML tags 106 and 108 that specify attributes for the user. For example, the XML tag 106 identifies the user identifier as "userl", where the value "userl" specifies another XML document within the XML applications and functions portion 96 that stores specific subscriber profile information, for example user name, work telephone number, cellular telephone number, pager number, and call forwarding profile information, etc. The XML tag 108 specifies a password state for the corresponding user; for example the XML tag 108 may specify the password to be entered by the user (e.g., "abxy"), or alternately the XML tag 108 may specify that the user has already been authenticated during a previous interaction during the same user session specified in the session identifier 104.

The application server 66 also generates an XML tag 110 that specifies the application state with the user. For example, the state "XML_Menu_State" specifies that the last page executed by the application server 66 for the corresponding session ID "12345" was the XML application page "main.xml". Hence, the application server 66, upon determining that the prior application state was "main.xml", may be able to determine the next subsequent page that needs to be generated for the user session based on the user input. For example, if the user input was a value of "2", the application server 66 would be able to interpret the input as selection "2" from a previously supplied main menu; hence, the application server 66 could execute the XML application that corresponds to selection "2" from the main menu of the user session, providing the perception to the user of a state-full interactive voice application.

FIGS. 8A–8E are diagrams illustrating XML documents executable by the application server 66 in a runtime environment for execution of voice web applications according to an embodiment of the present invention. As described above, three types of XML documents, menu documents, activity documents, and decision documents, are considered as "executable" XML documents in that they define user interface, boolean-type application logic, and functions to be performed (i.e., procedure calls to remote services).

FIG. 8E illustrates a menu document 112, where the application server 66 selects the subsequent XML document for processing based upon a user input. In particular, the menu document (identified by the XML tag "Type" 113 having a value of "menu") relates a numeric user input to another XML document. For example, the option XML tag 114 specifies that the application server 66 should access the XML menu file 116 entitled "act_get_voice_fax_email_menu.xml" and invoke the described menu in response to detecting a user input having a value of "1". The text field 118 describes the textual output that is displayed to an output device that can interpret the tag. Hence, the XML menu file 116 specifies user interface generation parameters, enabling the application server 66 to dynamically generate for the browser 56 or 62 a secondary menu that enables the user of the browser 56 or 62 to access voice, fax, and e-mail services. Detection of option "2"causes the application server 66 to access another XML document configured for composing and sending a new voice message. Detection of option "3" causes the application server 66 to execute a decision XML document, described below, to invoke a procedure from an external resource that can return any value; in this case, the application server 66 indicates execution of a procedure to determine the active greeting. Detection of the option "*9" causes the application server 66 to execute another decision XML document to invoke a procedure for a general logout of the user. Hence, the XML document 112 provides basic logical operations, enabling the application server 66 to select an XML document based on a received input.

The XML documents can also define logical operations, where the application server 66 can test conditions such as the content of subscriber attributes in order to execute based on "case" or "if then else" logic; hence, parameters and attributes may be set and compared and used by the application logic. For example, the application server 66, in response to receiving a user input and based on the determined state of the user interface session from the brownie 102, can identify another XML document for execution; alternatively, the XML document may specify logic in the form of menu structures, equivalent to if/then/else statements, for execution of selected XML documents based on returned values from a procedure call.

In particular, more advanced logic may be utilized by Activity XML documents, illustrated in FIG. 8A. An activity XML document 120 (identified by the XML tag "Type" 113 having a value of "activity") may be used to associate logic to a given procedure that is intended to interpret user input. For example, the procedure may be an LDAP routine that validates the user against a database, and responds with a positive integer value 0 (fail), 1 (success), or 2 (fallback). The activity XML document 120 includes an action tag 122 that ties the activity document 120 to the procedure (e.g., "session_validate"), and an Input tag 124 that specifies which XML document the application server 66 should load upon success of the called procedure (i.e., when the procedure returns a "1" for success). The activity XML document 120 also will include a Fallback tag 126 that specifies which XML document the application server 66 should load upon receiving a fallback value (i.e., when the procedure returns a "2" for fallback to another logical state). If the procedure returns a general system failure value of "0" or any value other than "1" or "2", a general error prompt can be played and the current activity will be redisplayed.

The activity document 120 also includes option XML tags 120 that enable a user to bypass the logic operation specified by the action tag 122, the input tag 124 and the fallback tag 126, and perform a menu based logic operation using prescribed user inputs, referred to as hotkey user inputs. Hence, the activity document 120 provides different hotkey options for different user inputs, for example if a user wishes to bypass a normal login procedure to request help, to request an extended menu, or to logout.

Hence, XML documents can be used to define any one of the three aspects of an executable application, namely user interface, logic, and procedures. The XML documents can define user interface parameters such as the above-described menu options, enabling the application server 66 to dynamically generate an HTML document having XML tags for voice media control, illustrated in FIG. 6. As such, the user interface capabilities include page content generated by the application server 66 including voice audio media files which prompt the user for input. If desired, the content may also include media files for timeout of expected input, recorded directives, and other voice control tags.

As described above, the activity XML document 120 includes an action tag 122 that enables the XML document to define procedure calls to known external resources using published interface protocols, for example LDAP, IMAP, SMTP, etc.. The function capabilities include authentication, presence indication, directory, subscriber attribute, messaging, calendar, media and other IP protocol addressable functions. In addition, functions such as state, logging, billing logging, monitoring, alarming, SQL database and other functions may be provided.

Decision XML documents 128, illustrated in FIGS. 8B–8D, also include action tags 122 and are identified by the type tag 113 having a value of "decision". Decision XML documents include an action XML tag 122 that specifies the function call to an executable procedure, for example "badlogin_reset", described below. Decision XML documents 120 are distinguishable from activity XML documents 120 in that the function calls specified in the decision XML documents 128 do not interpret user input; in addition, the returned values from the executed procedures specified in the decision XML documents 128 may return values other than success or fallback. Hence, the decision XML document 128 also includes option tags 126 that specify the actions to be taken based on the respective values returned by the procedure call specified by the action tag 122. Hence, the procedure specified by the action tag 122 dictates which XML option tag 126 is to be selected.

FIG. 6 is a diagram illustrating a web page 190 generated by the application server 66 for a browser. The XML tags within the web page 190 typically include XML directives that specify, for example, prompts to play, input patterns to match (e.g., (0–9, *0–*9, #, etc.), and optionally timeout parameters and record control. As shown in FIG. 6, the web page 190 may include a standard embed tag 200 in HTML format, and an in line XML portion 202 that includes media control information, such as a prompt list 204 and control information 206 for a record operation to be performed by the XML aware plug-in resource 86.

For example, the prompt list 204 specifies an audio file "wavfile.wav" to be played by the browser, for example as a welcome greeting. If the plug-in resource 86 in the browser is XML control aware, then the XML aware audio resource 86 begins to play the audio files "wavurl1" and "wavurl2" in the prescribed sequence. For example, the XML aware audio resource 86 plays a "Good Morning" prompt for wavurl1 and "Enter Your Phone Number followed by the Pound (#) Key" prompt for wavurl2, while waiting for an input pattern ([0–9] {7,9}#). This exemplary pattern ([0–9] {7,9}#) specifies to the XML aware audio resource 86 that a valid input is composed of any string of the characters 0 through 9 for a length of 7 to 9 digits, followed by a pound key. The XML aware audio resource 86 continues to play the audio files in the prescribed sequence while waiting for the user to input a key entry. The browser matches the user input to the input pattern, and posts the data to the voice application URL. If a record operation is pending, the audio resource 86 begins recording, for example by playing a tone to signal the user to begin speaking. The audio resource 86 continues to record until a timeout occurs (e.g., 30 seconds), or the user enters a key indicating recording should be halted. The browser can then "quietly" post the recorded audio file to the "upload URL" specified in the record tag 206, and then post the user input (e.g., as specified in the HTML form 208) to another URL specified within the HTML form 208.

Figure 7:
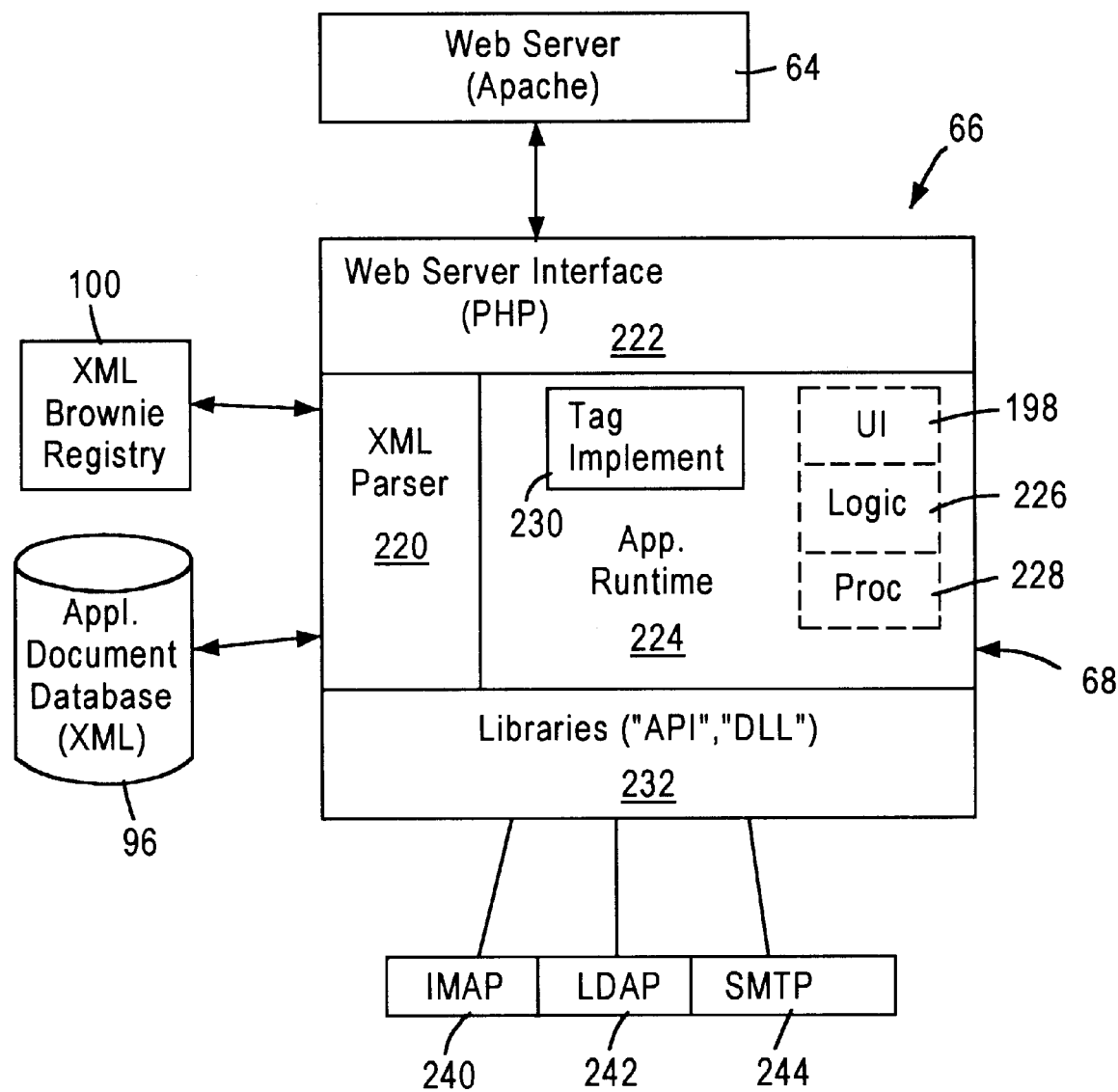
FIG. 7 is a diagram illustrating in detail the application server of FIG. 4 according to an embodiment of the present invention.

FIG. 7 is a diagram illustrating in detail the application server 66 according to an embodiment of the present invention. The application server 66 is implemented as a server executing a PHP hypertext processor with XML parsing and processing capabilities, available open source at http://www.php.net. As shown in FIG. 7, the server system 66 includes an XML parser 220 configured for parsing the application-defining XML documents (e.g., XML document 112) stored in the XML document database 96, or the XML documents (i.e., "brownies") 102 stored in the registry 100 and configured for specifying the state and attributes for respective user sessions. The application server 66 also includes a high speed interface 222 that establishes a high-speed connection between the application server 66 and the web server 64. For example, the PHP hypertext processor includes a high-speed interface for Apache Web servers.

The application server 66 also includes a runtime environment 224 for execution of the parsed XML documents. As described above, the runtime environment 224 may selectively execute any one of user interface operation 198, a logic operation 226, or a procedure call 228 as specified by the parsed XML document by executing a corresponding set of executable functions based on the rule set for the corresponding operation. In particular, the application runtime environment 224 includes a tag implementation module 230 that implements the XML tags parsed by the XML parser 220. The tag implementation module 230 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 230 implements the tag operations that are specified within the XML framework of the stored XML documents.

The application server 66 also includes a set of libraries 232 that may be implemented as dynamically linked libraries (DLLs) or application programming interface (API) libraries. The libraries 232 enable the runtime environment 224 to implement the procedures 228 as specified by the appropriate XML document. For example, the application server 66 may issue a function call to one of a plurality of IP protocol compliant remote resources 240, 242, or 244 according to IMAP protocol, LDAP Protocol, or SMTP protocol, respectively. For example, the PHP hypertext processor includes executable routines capable of accessing the IMAP or LDAP services. Note that the mechanisms for accessing the services 240, 242, or 244 should be established within the application server before use of XML documents that reference those services. Once the services 240, 242, or 244 are established, the application runtime environment 224 can perform a function operation by using executable functions specified by a function call rule set.

FIGS. 8A–8E are diagrams illustrating exemplary XML documents that specify a sequence of voice application operations to be performed by the voice application server 66 using the application runtime environment 224 according to an embodiment of the present invention. As described above, FIG. 8A illustrates an activity XML document 120 that implements a logic operation based on interpretation of a user input by a called procedure "session_validate" specified by the action XML tag 122. In particular, the activity XML document 120 includes an XML tag 130 that specifies an audio prompt to be supplied to the browser 56 or 62, in this case to obtain a password from the user. Once the application runtime environment 224 supplies the audio file specified by the XML tag 130 to the browser 56 or 62, the application server 66 updates the corresponding brownie state and returns to a restful state.

Figure 9:
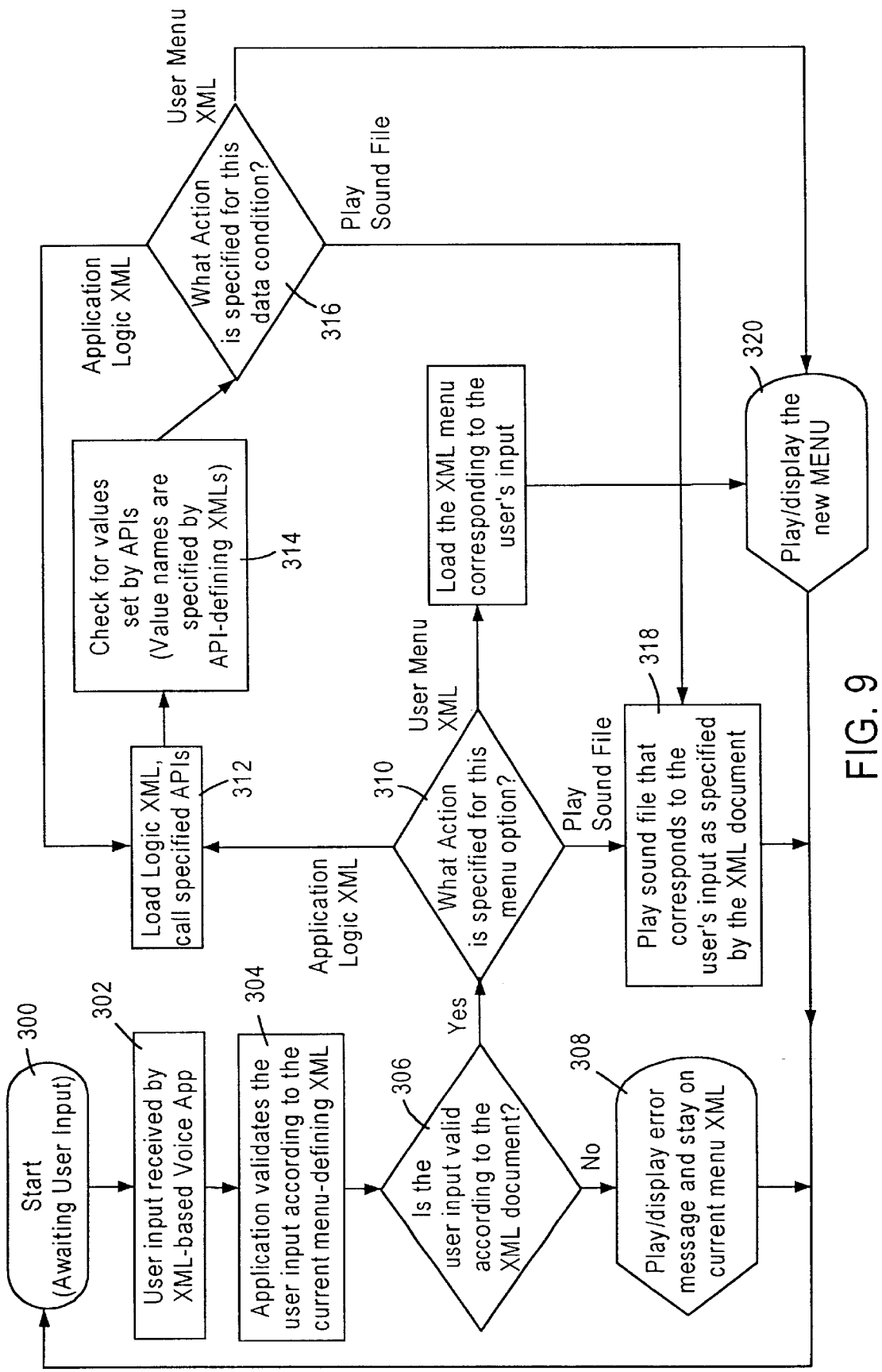
FIG. 9 is a flow diagram illustrating execution by the application server of XML documents for the dynamic generation of HTML/XML web pages for a web client according to an embodiment of the present invention.

FIG. 9 is a diagram illustrating execution of the XML documents in FIG. 8A–8E by the application server 66 according to an embodiment of the present invention. The steps described in FIG. 9 can be implemented as executable code that is stored on a computer readable medium (e.g., a hard disk drive, a floppy drive, a random access memory, a read only memory, an EPROM, a compact disk, etc). In this case, the executable code corresponds to the parser 220, the interface 222, and the runtime environment 224 that perform specific functions in response to implementation of the XML tags in the XML documents. The steps of FIG. 9 will be used to describe the execution of the exemplary XML documents in FIGS. 8A–8E.

The method begins in step 300, where the application server 66 awaits a user input, for example the password that was prompted by the XML tag 130 in the activity XML document 120. Upon receiving the user input in step 302, the application server 66 executes the action XML tag 122 by calling the procedure "session_validate" for validation of the user input in step 304. The application server 66 then determines in step 306 whether the procedure "session_validate" validates the user input by returning a "1"; if the procedure validates the input, the application server 66 executes the input XML tag 124 for execution of the specified XML document "PASSTHRU_LOG_RESET_LOCK.xml" in step 310, illustrated as XML document 128a in FIG. 8B. If the procedure "session_validate" indicated that the user input was invalid by returning a "2", then the application server 66 would execute in step 310 the fallback procedure specified by the fallback XML tag 126. Note that if the procedure "session_validate" returns a value of "0" indicating a user input error or a general failure (e.g., the procedure did not successfully at execute), a general error prompt may be played in step 308 and the current activity would be redisplayed .

Although not shown in FIG. 9, if the application server 66 detects that the user input includes hotkeys (e.g., #, *0, *1, etc.), then the option XML tags 126 enables the application server 66 to execute in step 310 the corresponding option XML tag, enabling the password validation operation specified by the XML action tag 122 to be bypassed.

FIG. 8B is a diagram illustrating the decision XML document 128a "PASSTHRU_LOG_RESET_LOCK.xml" specified by the input XML tag 124 of the activity XML document 120 in FIG. 8A. As described above, the application server 66 accesses the decision XML document 128a in response to execution of the input XML tag 124 in step 306; the application server 66 determines in step 310 what action is specified for the XML document 128a by parsing the type XML tag 113, and in this case determines that the XML document 128a specifies application logic. The application server 66 in response calls the procedure (e.g., "badlogin_reset") specified by the action XML tag 122 in step 312, for example to reset to zero the number of erroneous login entries. Note that the procedure call may be implemented using either separate XML documents or "procs" (e.g., PHP files that are used to tie API's together).

The application server 66 then checks in step 314 for the values set by the APIs during the function call specified by the action XML tag 122. Assume that the procedure "badlogin_reset"returns a "1", indicating that the procedure was successful; in that case, the application server 66 accesses the corresponding XML document "DECISION_CHOOSE_USER_LEVEL.xml", illustrated as the decision XML document 128b in FIG. 8C. The application server 66 determines in step 316 that the decision XML document 128b specifies application logic, and generates in step 312 a function call to the procedure "session_checkuserlevel" a specified by the action XML tag 122. The procedure "session_checkuserlevel" may be used, for example, to determine a registration level for a new user. The application server 66 then determines in step 314 the registration level of the user based on the value returned by the procedure "session_checkuserlevel". Assume the procedure "session_checkuserlevel" returns a value of "7"; in response, the application server 66 accesses the XML document "DECISION_INV_NEW.xml", illustrated as XML document 128c in FIG. 8D.

FIG. 8D is a diagram illustrating a decision XML document 128c having an action XML tag 122 specifying a procedure "message_fullreadnewinv" for checking for stored voice, fax, or email messages. The application server 66 calls the procedure as described above with respect to step 312, and checks the returned value from the procedure "message_fullreadnewinv"; if the value is a "1", "4", "6" or "7", the application server 66 accesses the XML document "DECISION_INV_AUTOPLAY.xml" for transfer of sound files to the browser in step 318 that include stored messages. If the procedure "message_fullreadnewinv" returns a value of "2", "3", "5", or "8", then the application server 66 accesses the menu XML document 112 "AUD_MAIN_MENU.xml", illustrated in FIG. 8E. Upon execution of the menu XML document 112, the application server 66 determines in step 316 that a user menu XML document is to be generated, and generates in step 320 the appropriate media content for the browser 56 or 62 to play or display the new menu for the user.

According to the disclosed embodiment, voice-enabled web applications are defined using XML documents specifying respective voice application operations using a prescribed rule set recognizable by an application runtime environment in an application server. Hence, voice-enabled web applications can be developed without the necessity of conventional tools that require writing an application in a programming language, followed by compiling the written application prior to execution. Rather, use of XML documents to describe the voice applications enables conventional web programmers to HTML and XML development techniques to develop voice enable web applications. Consequently, voice enabled web applications can now be developed as an open source with the sharing of XML based development tools among web users.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an executable system for defining an executable voice application, the method comprising:

defining a sequence of voice application operations to be performed by the voice application, each voice application operation corresponding to at least one of a user interface operation, a logic operation, and a function operation;

generating extensible markup language (XML) documents for the voice application operations, respectively, using a prescribed rule set for each of the user interface operation, the logic operation, and the function operation, the rule set specifying executable functions to be performed by an application runtime environment for the corresponding operation, the generating step including:

(1) providing at least one XML tag that specifies a corresponding one of the user interface operation, logic operation, and function operation in accordance with the corresponding rule set, and (2) selectively including in each XML document a reference to another one of the XML documents based on the sequence of voice application operations and the corresponding rule set; and storing the XML documents for execution of the voice application by an application server in the application runtime environment.

2. The method of claim 1, wherein the generating step includes generating a menu XML document specifying performance of a first logic operation based on a user input.

3. The method of claim 2, wherein the generating step further includes generating an activity XML document specifying performance of a second logic operation based on a returned value from an executed procedure evaluating a second user input, the activity XML document including an action XML tag specifying performance of a first function operation that specifies calling the executed procedure, the application runtime environment executing the executable functions corresponding to calling the executed procedure.

4. The method of claim 3, wherein the step of generating an activity XML document includes specifying an input XML tag that specifies a first one of the other XML documents for execution in response to the returned value specifying a successful condition, and a fallback XML tag that specifies a second one of the other XML documents for execution in response to the returned value specifying a fallback condition.

5. The method of claim 3, wherein the step of generating an activity XML document further includes providing option XML tags specifying bypassing the second logic operation and performing a third logic operation in response to receiving one of a group of prescribed user inputs as the second user input.

6. The method of claim 5, wherein the prescribed user inputs correspond to hotkey user inputs.

7. The method of claim 2, wherein the step of generating a menu document includes adding a plurality of option XML tags, each specifying a corresponding XML document for execution in response to a corresponding value for the user input, the application runtime environment executing the first logic operation by selecting one of the XML documents for execution based on the corresponding value for the user input.

8. The method of claim 1, wherein the generating step includes generating a decision XML document specifying performance of the first logic operation based on a returned value from an executed procedure, the decision XML document including an action XML tag specifying performance of a first function operation that specifies calling the executed procedure, the application runtime environment executing the executable functions corresponding to calling the executed procedure.

9. The method of claim 8, wherein the step of generating a decision XML document includes adding a plurality of option XML tags, each specifying a corresponding XML document for execution in response to a corresponding prescribed returned value from the executed procedure, the first logic operation selecting one of the XML documents for execution based on reception of the corresponding prescribed returned value from the executed procedure.

10. The method of claim 8, wherein the prescribed rule set for the action XML tag for the decision XML document specifies performing the first function operation independent of any user input.

11. The method of claim 1, wherein the generating step includes generating an activity XML document specifying performance of a first logic operation based on a returned value from an executed procedure evaluating a user input, the activity XML document including an action XML tag specifying performance of a first function operation that specifies calling the executed procedure, the application runtime environment executing the executable functions corresponding to calling the executed procedure.

12. The method of claim 11, wherein the step of generating an activity XML document includes specifying an input XML tag that specifies a first one of the other XML documents for execution in response to the returned value specifying a successful condition, and a fallback XML tag that specifies a second one of the other XML documents for execution in response to the returned value specifying a fallback condition.

13. The method of claim 11, wherein the step of generating an activity XML document further includes providing option XML tags specifying bypassing the second logic operation and performing a third logic operation in response to receiving one of a group of prescribed user inputs as the user input.

14. The method of claim 13, wherein the prescribed user inputs correspond to hotkey user inputs.

15. The method of claim 1, wherein the generating step includes generating a user menu XML document that specifies user menu media information to be supplied to the user.

16. The method of claim 1, further comprising defining the rule sets for each of the user interface operation, the logic operation, and the function operation.

17. A system configured for generating a voice application, the system including:
a computer-based system configured for generating extensible markup language (XML) documents for a defined sequence of voice application operations to be performed by the voice application, respectively, each voice application operation corresponding to at least one of a user interface operation, a logic operation, and a function operation using a corresponding prescribed rule set, the rule set specifying executable functions to be performed by an application runtime environment for the corresponding operation, each XML document including (1) at least one XML tag that specifies a corresponding one of the user interface operation, logic operation, and function operation in accordance with the corresponding rule set, and selectively including (2) a reference to another one of the XML documents based on the sequence of voice application operations and the corresponding rule set; and
a storage medium configured for storing the XML documents for execution of the voice application by an application server in the application runtime environment.

18. The system of claim 17, wherein the computer-based system generates a menu XML document specifying performance of a first logic operation based on a user input.

19. The system of claim 18, wherein the computer-based system generates an activity XML document specifying performance of a second logic operation based on a returned value from an executed procedure evaluating a second user input, the activity XML document including an action XML tag specifying performance of a first function operation that specifies calling the executed procedure, the application runtime environment executing the executable functions corresponding to calling the executed procedure.

20. The system of claim 19, wherein the computer-based system includes in the activity XML document an input XML tag that specifies a first one of the other XML documents for execution in response to the returned value specifying a successful condition, and a fallback XML tag that specifies a second one of the other XML documents for execution in response to the returned value specifying a fallback condition.

21. The system of claim 19, wherein the computer-based system includes in the activity XML document a plurality of option XML tags specifying bypassing the second logic operation and performing a third logic operation in response to receiving one of a group of prescribed user inputs as the second user input.

22. The system of claim 21, wherein the prescribed user inputs correspond to hotkey user inputs.

23. The system of claim 18, wherein the computer-based system includes in the menu XML document a plurality of option XML tags, each specifying a corresponding XML document for execution in response to a corresponding value for the user input, the application runtime environment executing the first logic operation by selecting one of the XML documents for execution based on the corresponding value for the user input.

24. The system of claim 17, wherein the computer-based system generates a decision XML document specifying performance of the first logic operation based on a returned value from an executed procedure, the decision XML document including an action XML tag specifying performance of a first function operation that specifies calling the executed procedure, the application runtime environment executing the executable functions corresponding to calling the executed procedure.

25. The system of claim 24, wherein the computer-based system includes in the decision XML document a plurality of option XML tags, each specifying a corresponding XML document for execution in response to a corresponding prescribed returned value from the executed procedure, the first logic operation selecting one of the XML documents for execution based on reception of the corresponding prescribed returned value from the executed procedure.

26. The system of claim 24, wherein the prescribed rule set for the action XML tag for the decision XML document specifies performing the first function operation independent of any user input.

27. The system of claim 17, wherein computer-based system generates an activity XML document specifying performance of a first logic operation based on a returned value from an executed procedure evaluating a user input, the activity XML document including an action XML tag specifying performance of a first function operation that specifies calling the executed procedure, the application runtime environment executing the executable functions corresponding to calling the executed procedure.

28. The system of claim 27, wherein the computer-based system includes in the activity XML document an input XML tag that specifies a first one of the other XML documents for execution in response to the returned value specifying a successful condition, and a fallback XML tag that specifies a second one of the other XML documents for execution in response to the returned value specifying a fallback condition.

29. The system of claim 27, wherein the computer-based system includes in the activity XML document a plurality of option XML tags specifying bypassing the second logic operation and performing a third logic operation in response to receiving one of a group of prescribed user inputs as the user input.

30. The system of claim 29, wherein the prescribed user inputs correspond to hotkey user inputs.

31. The system of claim 17, wherein the computer-based system generates a user menu XML document that specifies user menu media information to be supplied to the user.

32. The system of claim 17, wherein the computer-based system defines the rule sets for each of the user interface operation, the logic operation, and the function operation.

33. A computer readable medium having stored thereon sequences of instructions for defining a voice application, the sequences of instructions including instructions for performing the steps of:
  defining a sequence of voice application operations to be performed by the voice application, each voice application operation corresponding to at least one of a user interface operation, a logic operation, and a function operation;
  generating extensible markup language (XML) documents for the voice application operations, respectively, using a prescribed rule set for each of the user interface operation, the logic operation, and the function operation, the rule set specifying executable functions to be performed by an application runtime environment for the corresponding operation, the generating step including:
    (1) providing at least one XML tag that specifies a corresponding one of the user interface operation, logic operation, and function operation in accordance with the corresponding rule set, and (2) selectively including in each XML document a reference to another one of the XML documents based on the sequence of voice application operations and the corresponding rule set; and
  storing the XML documents for execution of the voice application by an application server in the application runtime environment.

34. The medium of claim 33, wherein the generating step includes generating a menu XML document specifying performance of a first logic operation based on a user input.

35. The medium of claim 34, wherein the generating step further includes generating an activity XML document specifying performance of a second logic operation based on a returned value from an executed procedure evaluating a second user input, the activity XML document including an action XML tag specifying performance of a first function operation that specifies calling the executed procedure, the application runtime environment executing the executable functions corresponding to calling the executed procedure.

36. The medium of claim 35, wherein the step of generating an activity XML document includes specifying an input XML tag that specifies a first one of the other XML documents for execution in response to the returned value specifying a successful condition, and a fallback XML tag that specifies a second one of the other XML documents for execution in response to the returned value specifying a fallback condition.

37. The medium of claim 35, wherein the step of generating an activity XML document further includes providing option XML tags specifying bypassing the second logic operation and performing a third logic operation in response to receiving one of a group of prescribed user inputs as the second user input.

38. The medium of claim 37, wherein the prescribed user inputs correspond to hotkey user inputs.

39. The medium of claim 34, wherein the step of generating a menu document includes adding a plurality of option XML tags, each specifying a corresponding XML document for execution in response to a corresponding value for the user input, the application runtime environment executing the first logic operation by selecting one of the XML documents for execution based on the corresponding value for the user input.

40. The medium of claim 33, wherein the generating step includes generating a decision XML document specifying performance of the first logic operation based on a returned value from an executed procedure, the decision XML document including an action XML tag specifying performance of a first function operation that specifies calling the executed procedure, the application runtime environment executing the executable functions corresponding to calling the executed procedure.

41. The medium of claim 40, wherein the step of generating a decision XML document includes adding a plurality of option XML tags, each specifying a corresponding XML document for execution in response to a corresponding prescribed returned value from the executed procedure, the first logic operation selecting one of the XML documents for execution based on reception of the corresponding prescribed returned value from the executed procedure.

42. The medium of claim 40, wherein the prescribed rule set for the action XML tag for the decision XML document specifies performing the first function operation independent of any user input.

43. The medium of claim 33, wherein the generating step includes generating an activity XML document specifying performance of a first logic operation based on a returned value from an executed procedure evaluating a user input, the activity XML document including an action XML tag specifying performance of a first function operation that specifies calling the executed procedure, the application runtime environment executing the executable functions corresponding to calling the executed procedure.

44. The medium of claim 43, wherein the step of generating an activity XML document includes specifying an input XML tag that specifies a first one of the other XML documents for execution in response to the returned value specifying a successful condition, and a fallback XML tag that specifies a second one of the other XML documents for execution in response to the returned value specifying a fallback condition.

45. The medium of claim 43, wherein the step of generating an activity XML document further includes providing option XML tags specifying bypassing the second logic operation and performing a third logic operation in response to receiving one of a group of prescribed user inputs as the user input.

46. The medium of claim 45, wherein the prescribed user inputs correspond to hotkey user inputs.

47. The medium of claim 33, wherein the generating step includes generating a user menu XML document that specifies user menu media information to be supplied to the user.

48. The medium of claim 33, further comprising instructions for performing the step of defining the rule sets for each of the user interface operation, the logic operation, and the function operation.

* * * * *